(12) United States Patent
Zhu et al.

(10) Patent No.: US 8,351,158 B2
(45) Date of Patent: *Jan. 8, 2013

(54) TOP BOND PAD FOR TRANSDUCING HEAD INTERCONNECT

(75) Inventors: Jianxin Zhu, Eagan, MN (US); David A. Sluzewski, Edina, MN (US); Lance E. Stover, Eden Prairie, MN (US); Joel W. Hoehn, Hudson, WI (US); Kevin J. Schulz, Apple Valley, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/046,242

(22) Filed: Mar. 11, 2011

(65) Prior Publication Data

US 2011/0157750 A1 Jun. 30, 2011

Related U.S. Application Data

(63) Continuation of application No. 11/439,047, filed on May 23, 2006, now Pat. No. 7,929,248.

(51) Int. Cl.
*G11B 5/60* (2006.01)
(52) U.S. Cl. .................... 360/234.5; 360/235.1
(58) Field of Classification Search ............... 360/234.5, 360/235.1, 235.2, 235.3, 245.8, 245.9
See application file for complete search history.

(56) References Cited

U.S. PATENT DOCUMENTS

| | | | |
|---|---|---|---|
| 4,219,853 A | 8/1980 | Albert et al. | |
| 4,761,699 A | 8/1988 | Ainslie et al. | |
| 4,789,914 A | 12/1988 | Ainslie et al. | |
| 5,068,759 A | 11/1991 | Matsuzaki | |
| 5,200,869 A | 4/1993 | Matsuzaki | |
| 5,293,288 A | 3/1994 | Ishikawa et al. | |
| 5,396,390 A | 3/1995 | Arakawa et al. | |
| 5,491,597 A | 2/1996 | Bennin et al. | |
| 5,610,783 A | 3/1997 | Maffitt et al. | |
| 5,768,062 A | 6/1998 | Anderson et al. | |
| 5,774,975 A | 7/1998 | Maffitt et al. | |
| 5,815,347 A | 9/1998 | Pattanaik | |
| 5,896,248 A | 4/1999 | Hanrahan et al. | |
| 5,914,834 A | 6/1999 | Gustafson | |
| 6,008,968 A | 12/1999 | Lazzari | |
| 6,098,270 A | 8/2000 | Lazzari | |
| 6,188,546 B1 | 2/2001 | Nakajima et al. | |
| 6,282,062 B1 | 8/2001 | Shiraishi | |

(Continued)

OTHER PUBLICATIONS

L.-S. Fan, et al., "Electrostatic Microactuator and Design Consideratinos for HDD Applications", from IEEE Transactions on Magnetics, vol. 35, No. 2, Mar. 1999.

*Primary Examiner* — Jefferson Evans
(74) *Attorney, Agent, or Firm* — Fredrikson & Byron, PA

(57) ABSTRACT

A slider includes a slider body having a first side and edges defined adjacent to the first side, at least two separate insulators each adjacent to the first side of the slider body and supported by the slider body, and a conductive trace adjacent to each of the at least two separate insulators and opposite the first side of the slider body. The at least two separate insulators each are in physical contact with the slider body along the first side of the slider body such that the at least two separate insulators are physically attached to the slider body to electrically insulate each conductive trace from the slider body.

12 Claims, 6 Drawing Sheets

U.S. PATENT DOCUMENTS

| | | |
|---|---|---|
| 6,351,353 B1 | 2/2002 | Sluzewski et al. |
| 6,544,880 B1 * | 4/2003 | Akram .......................... 438/617 |
| 6,665,136 B2 | 12/2003 | Clinton et al. |
| 6,671,127 B2 | 12/2003 | Hsu et al. |
| 6,707,152 B1 | 3/2004 | Schrock |
| 6,757,135 B2 | 6/2004 | Rancour et al. |
| 6,925,702 B2 | 8/2005 | Krounbi et al. |
| 6,985,332 B1 | 1/2006 | Sluzewski et al. |
| 2003/0161069 A1 | 8/2003 | Hipwell, Jr. et al. |
| 2006/0012922 A1 | 1/2006 | Shoji |
| 2006/0044689 A1 | 3/2006 | Lille |
| 2006/0118963 A1 * | 6/2006 | Yamada ....................... 257/760 |

* cited by examiner

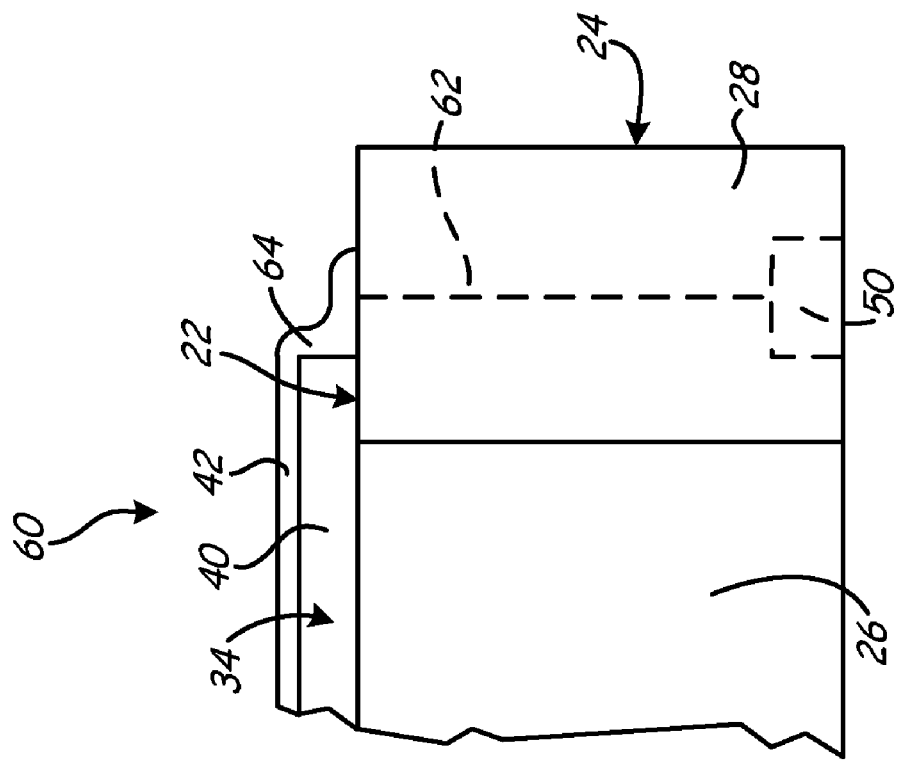
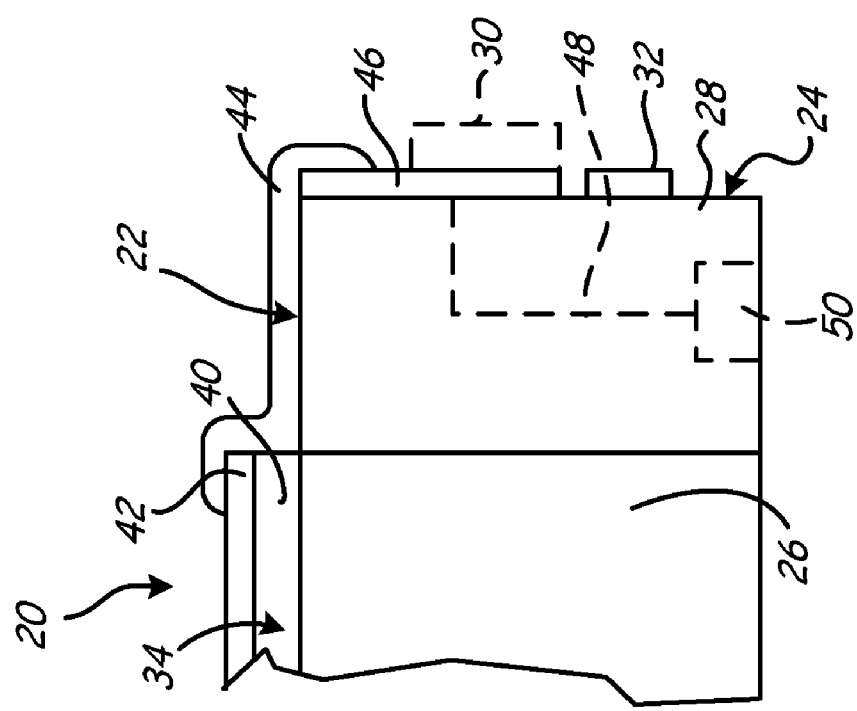

US 8,351,158 B2

TOP BOND PAD FOR TRANSDUCING HEAD INTERCONNECT

CROSS-REFERENCE TO RELATED APPLICATION(S)

This application is a continuation of U.S. patent application Ser. No. 11/439,047, filed May 23, 2006.

BACKGROUND OF THE INVENTION

The present invention relates to electrical interconnection structures, and more particularly to interconnect trace and bond pad structures for use in conjunction with slider assemblies carrying transducing heads.

Hard disc drives (HDDs) typically comprise one or more discs, each disc having concentric data tracks for storing data. Where multiple discs are used, a stack is formed of co-axial discs having generally the same diameter. A transducing head carried by a slider is used to read from and write to a data track on a disc. The slider is carried by a head arm assembly (HAA) that includes an actuator arm and a suspension assembly, which can include a separate gimbal structure or can integrally form a gimbal. As the disc is spun, the slider glides above the surface of the disc on a small cushion of air. The actuator arm movably positions the slider with respect to the disc. Electrical connections extend along the suspension to electrically connect the transducing head to components located at or near the actuator arm. Those electrical connections can be formed on the suspension itself, or can be located on a separate interconnect structure supported relative to the suspension, such as a flex-on suspension (FOS).

The slider includes a slider body (called the "substrate") and an overcoat that includes the transducing head. The slider body is electrically conductive, while the overcoat is electrically insulative. A plurality of bond pads, usually a minimum of four, are formed at a side or edge of the slider—typically at its trailing edge. These bond pads are directly connected through the overcoat to various components, such as to the transducing head or to a heater. During fabrication of a HDD, the bond pads are electrically connected to the electrical connections (i.e., traces) along the suspension. Typically, a conventional gold ball soldering operation is used to make the electrical connections from the bond pads of the slider to the electrical connections of the suspension. Separately, the slider is mechanically secured to a load button or load point of the gimbal at a back side of the slider (synonymously called the "top" of the slider), for example, with an adhesive.

As areal recording density for HDDs increases, the sizes of sliders and transducing heads continue to decrease. Numerous other factors have also influenced smaller slider sizes. Accordingly, sliders can have dimensions of about 1 mm in width, 1.3 mm in length and 200-300 µm in thickness. Trends are for sliders to continue to be smaller, with lengths of 1 mm or less and widths of 700-800 µm or less. The sizes of bond pads decrease accordingly with smaller slider sizes.

Decreasing slider and bond pad sizes present numerous difficulties. For example, conventional methods and equipment used for gold ball bonding are no longer reliable for smaller sliders with small conventional bond pads at a side or edge of the slider. Moreover, less space is available along the sides or edges of the slider for large numbers of electrically isolated bond pads.

Thus, the present invention provides a slider assembly having an alternative slider interconnect trace and bond pad assembly.

BRIEF SUMMARY OF THE INVENTION

A slider according to the present invention includes a slider body having a first side and edges defined adjacent to the first side, at least two separate insulators each adjacent to the first side of the slider body and supported by the slider body, and a conductive trace adjacent to each of the at least two separate insulators and opposite the first side of the slider body. The at least two separate insulators each are in physical contact with the slider body along the first side of the slider body such that the at least two separate insulators are physically attached to the slider body to electrically insulate each conductive trace from the slider body.

BRIEF DESCRIPTION OF THE DRAWINGS

FIG. 4 is a schematic side view of a portion of the slider assembly of FIGS. 1-3.

FIG. 5 is a schematic side view of a portion of an alternative embodiment of a slider assembly according to the present invention.

DETAILED DESCRIPTION

Figure 1:
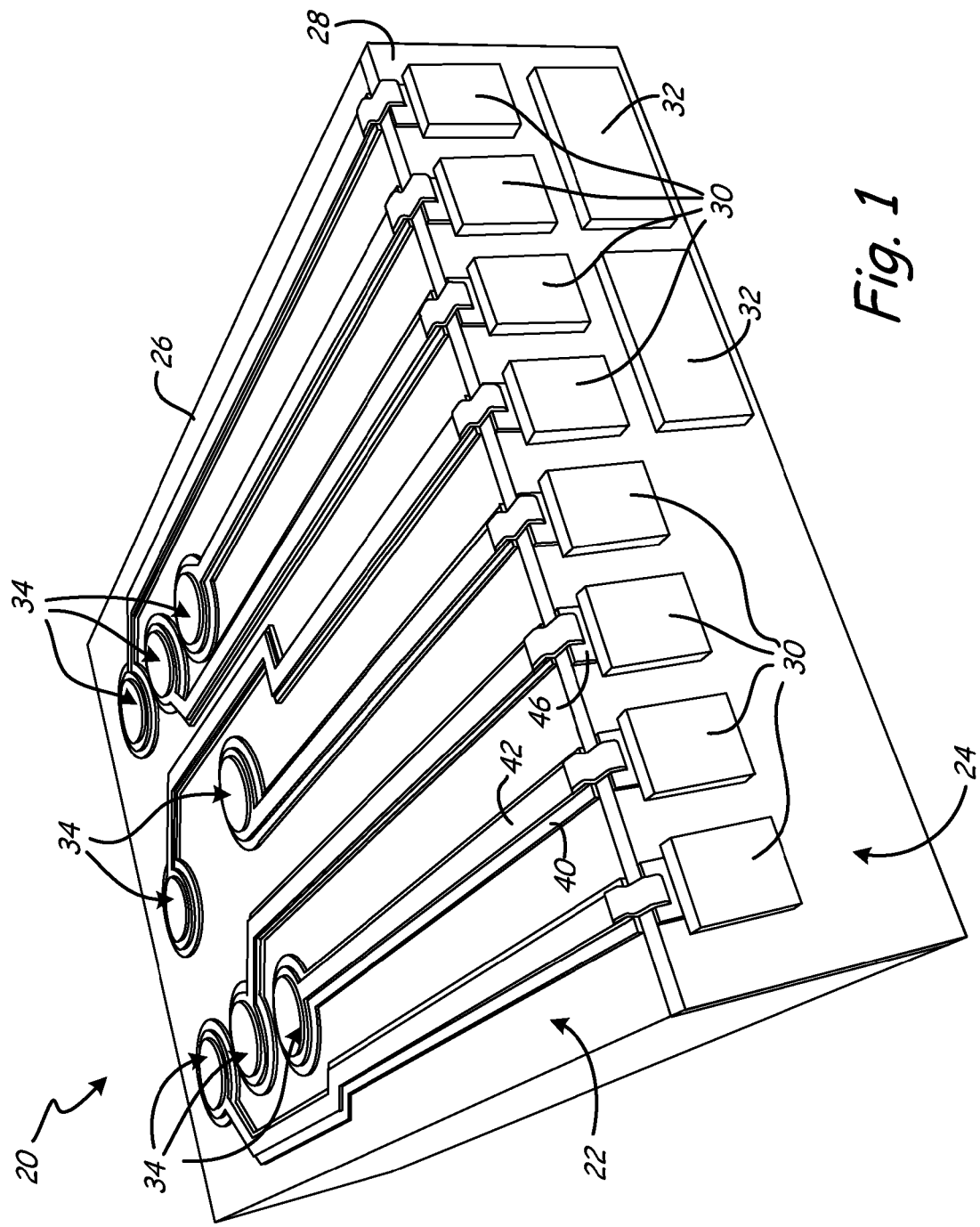
FIG. 1 is a perspective view showing the back side and trailing edge of a slider assembly according to the present invention.

FIG. 1 is a perspective view of a slider assembly 20, showing a back side 22 (synonymously called the "top") and a trailing edge 24 of the slider assembly 20. The slider assembly 20 includes a slider body 26 portion and an overcoat portion 28 that is located at the trailing edge 24. The overcoat portion 28 can include a number of individual layers that are not shown for simplicity. As shown in FIG. 1, a plurality of conventional trailing edge bond pads 30 and conventional lapping pads 32 are located at the trailing edge 24 of the slider assembly 20. A plurality of interconnect structures 34 are provided that extend along the back side 22 of the slider assembly 20. In the illustrated example, eight interconnect structures 34 are provided, and each interconnect structure 34 is electrically connected with a corresponding bond pad 30.

Figure 2:
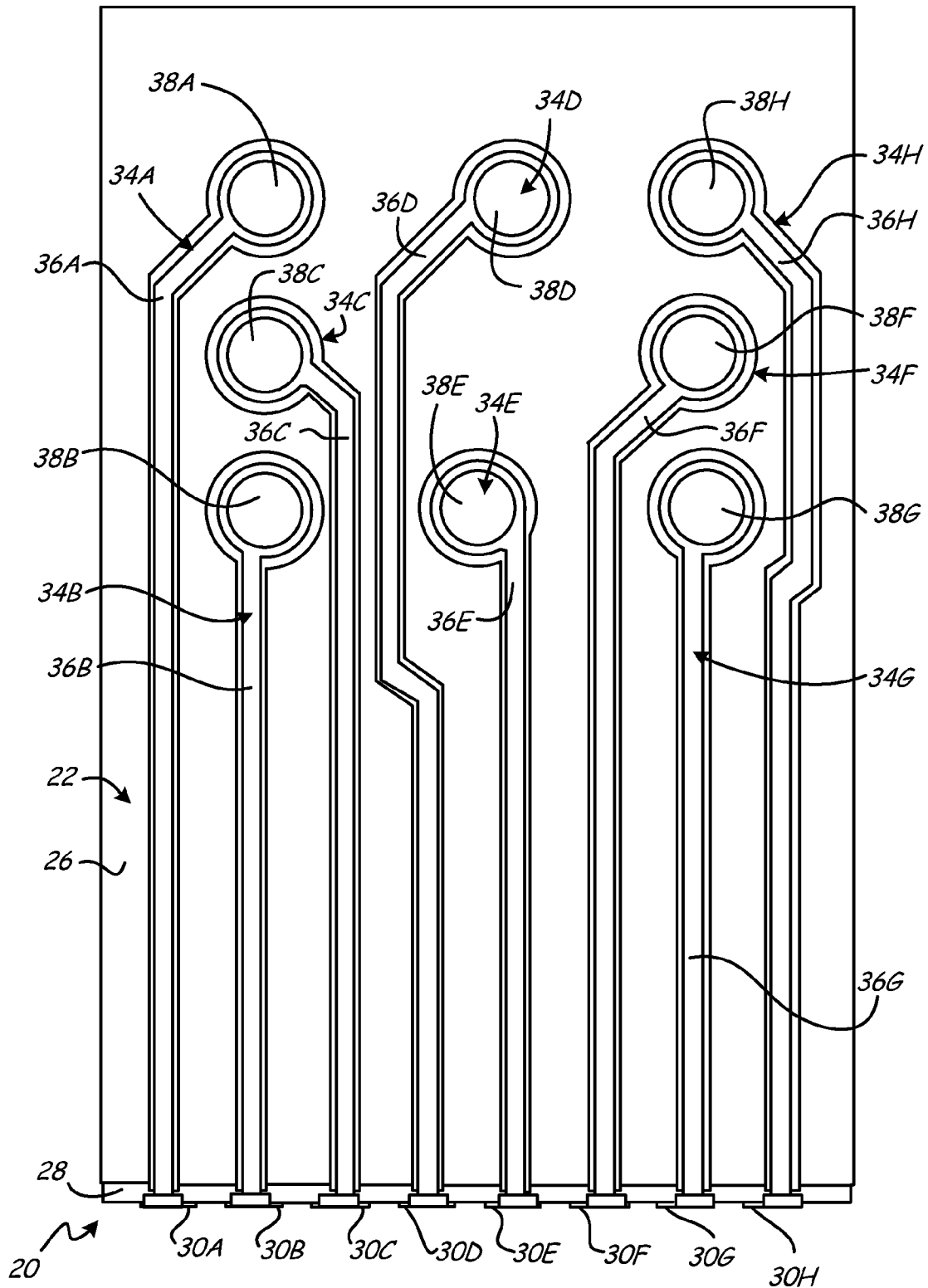
FIG. 2 is a top view of the slider assembly of FIG. 1, showing the back side of the slider assembly.

FIG. 2 is a top view of the slider assembly 20. As shown in FIG. 2, eight interconnect structures 34A-34H extend along the back side 22 of the slider assembly 20. Each interconnect structure 34A-34H includes a respective interconnect trace 36A-36H and a respective top bond pad 38A-38H. The shape of each interconnect trace 36A-36H can vary as desired. However, the interconnect traces 36A-36H are generally elongate in shape and arranged so as to provide unobstructed electrical connection paths between the top bond pads 38A-

38H and desired connection points on the slider assembly 20. The top bond pads 38A-38H are generally positioned at a terminal region of the respective interconnect traces 36A-36H. Each top bond pad 38A-38H is generally larger than an adjacent portion of the respective interconnect trace 36A-36H. As shown in FIGS. 1 and 2, the top bond pads 38A-38H are circular in shape, although the top bond pads 38A-38H can have other shapes as desired.

Figure 3:
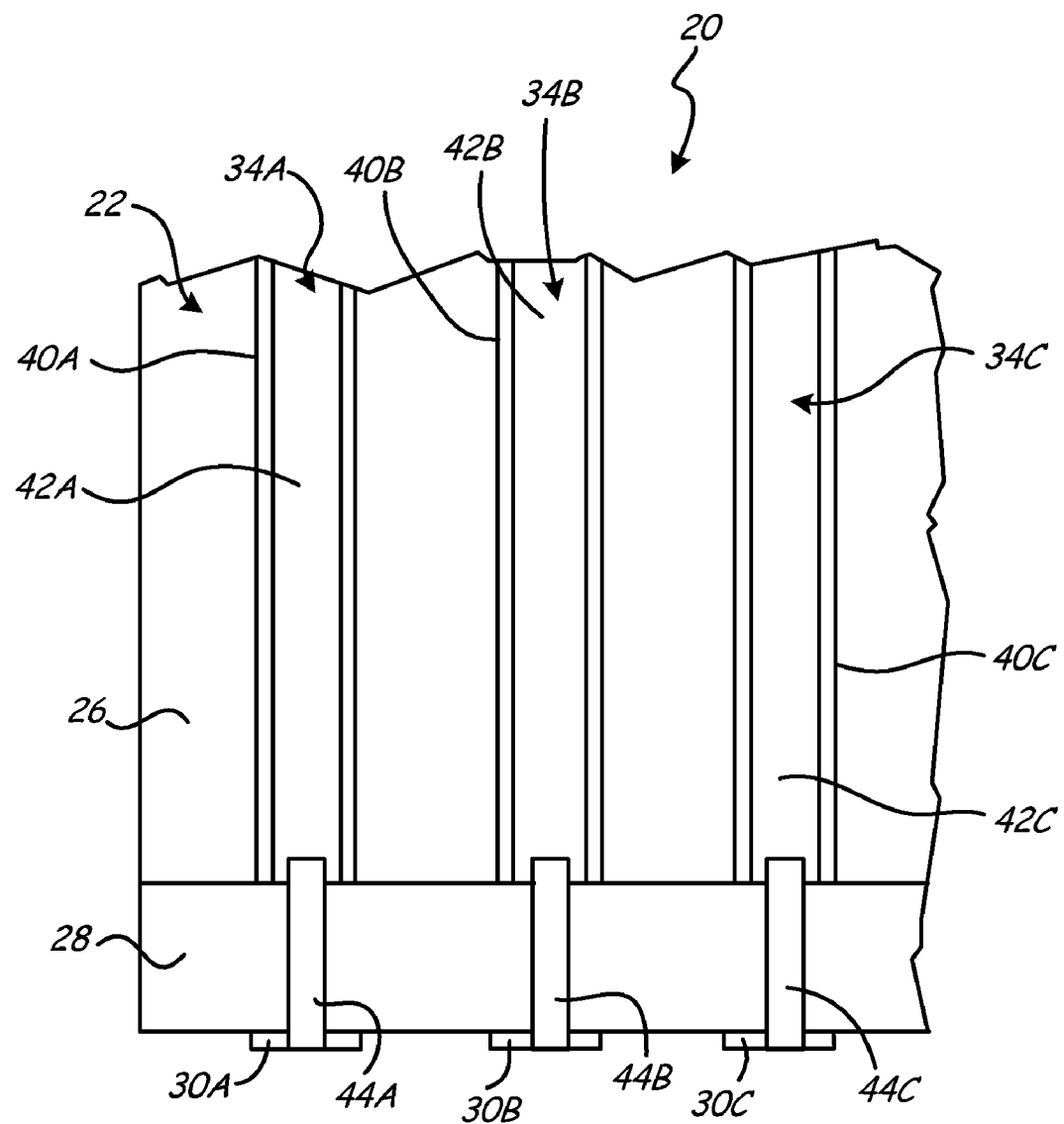
FIG. 3 is a schematic top view of a portion of the slider assembly of FIGS. 1 and 2.

FIG. 3 is a schematic top view of a portion of the slider assembly 20. As shown in FIG. 3, each interconnect structure 34 (only interconnect structures 34A-34C are shown in FIG. 3) includes a respective electrically insulative portion 40A-40C and a respective electrically conductive portion 42A-42C. The insulative portions 40A-40C are located adjacent to the back side 22 of the slider assembly 20, and are located between the conductive portions 42A-42C and the slider body 26. The slider body 26 is formed of a conductive material (e.g., AlTiC), and the insulative portions 40A-40C prevent shorting of the interconnect structures 34 through the slider body 26. The insulative portions 40A-40C are formed as discrete insulators that are localized relative to the conductive portions 42A-42C, rather than as a unitary sheet across the entire back side 22 of the slider assembly 20. The discrete, localized insulator patterns provide a number of benefits, such helping promoting simple and easy fabrication. The discrete, localized insulator patterns also can help improve stress conditions when the slider assembly 20 is attached to another component.

It should be noted that additional layers can be included in the structures shown in FIGS. 1-3. For instance, as explained more fully below, the conductive portions 42A-42C can include multiple layers, and their exposed surfaces can comprise a wick-stop (or anti-wetting) material. Suitable wick-stop materials include dielectric materials.

Connection or wrap-around traces 44A-44C are provided adjacent to the overcoat 28. Each connection trace 44A-44C is electrically connected between the conductive portion 42A-42C of its respective interconnect structure 34A-34C and a desired electrical connection point. The connection traces 44A-44C enable the interconnect structures 34 to be electrically connected to components, for example, electrical connection studs, that are located at the overcoat 28. The overcoat 28 is formed of an electrically insulative material (e.g., $Al_2O_3$), and therefore the connection traces 44A-44C can be deposited directly on the overcoat 28 without shorting. The connection traces 44A-44C can be unitary with the conductive portions 42A-42C of the interconnect structure, or can be separate and distinct as shown in FIG. 3.

FIG. 4 is a schematic side view of a portion of the slider assembly 20. As shown in FIG. 4, a conductive seed layer trace 46 is located at the trailing edge 24 of the slider assembly 20. The seed layer trace 46 is electrically connected between the connection trace 44 and a stud 48 (i.e., an electrical lead embedded in the overcoat 28), which is in turn connected to a transducing head 50 or other component. The seed layer trace 46 is formed using a photolithography process similar to those conventionally used to form trailing edge seed layers (i.e., anode layers used for plating procedures) in conjunction with the fabrication of trailing edge bond pads. Seed layers, such as seed layer trace 46, are typically formed of conductive materials that provide good adhesion (e.g., Cr, Ti, Ta, etc.).

A trailing edge bond pad 30 is shown in phantom in FIG. 4 disposed adjacent to the seed layer trace 46. It should be recognized that conventional trailing edge bond pads 30 are optional according to the present invention, because slider assemblies having top bond pads do not require additional trailing edge bond pads. However, it may be desirable to provide redundant bond pad structures in some situations, for instance, where available testing equipment is configured for slider assemblies having trailing edge bond pads.

Although the particular dimensions will vary according to the desired application, the seed layer trace 46 can have a thickness of about 2,000 Å and the optional bond pad 30 can have a thickness of about 4-5 μm.

It is possible to configure a slider assembly according to the present invention in different ways, as desired. For instance, FIG. 5 is a schematic side view of a portion of an alternative slider assembly 60. The slider assembly 60 is similar to the slider assembly 20 described above. However, a stud 62 that is electrically connected to a component, for example, the transducing head 50, extends to a location on the overcoat 28 at the back side 22 of the slider assembly 60. A connection trace 64 electrically connects the stud 62 and the conductive portion 42 of the interconnect structure 34.

Figure 6C:
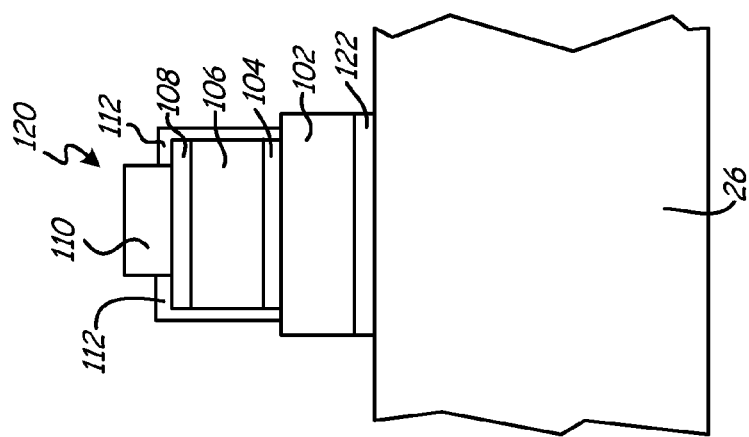
FIG. 6C is a schematic cross-sectional view of an alternative embodiment of a multi-layer bond pad stack according to the present invention.
Figure 6B:
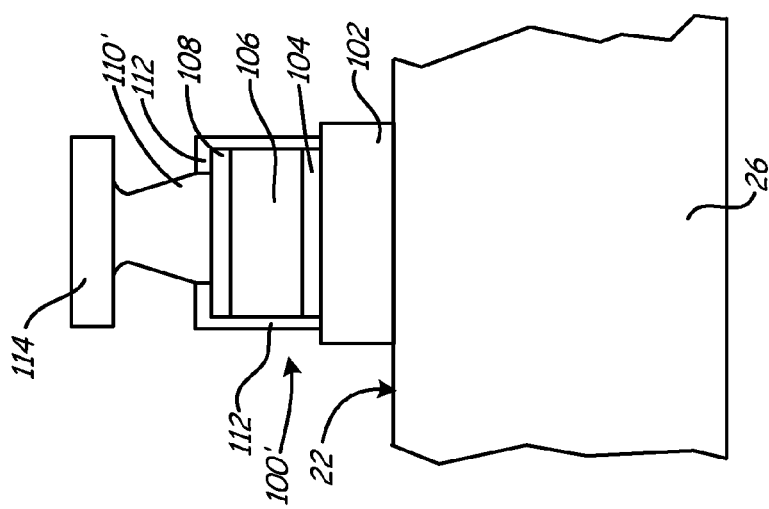
FIG. 6B is a schematic cross-sectional view of the multi-layer bond pad stack of FIG. 6A soldered to an adjacent component.
Figure 6A:
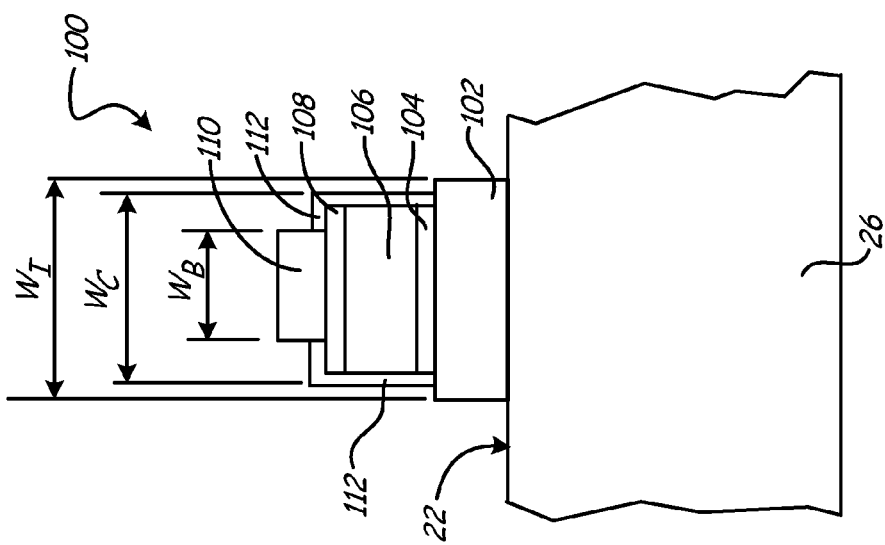
FIG. 6A is a schematic cross-sectional view of a multi-layer bond pad stack according to the present invention.

FIG. 6A is a schematic cross-sectional view of a multi-layer stack 100 located adjacent to a slider body 26 (i.e., a conductive substrate). Stack 100 can form a bond pad portion of a slider assembly. Stack 100 includes an insulator layer 102, a lower diffusion barrier layer 104, a conductor layer 106, a solder-wettable upper diffusion barrier layer 108, a consumable oxidation barrier layer 110, and a wick-stop layer 112 (i.e., an anti-wetting coating). Additional layers may be included in further embodiments, as desired. The insulator layer 102 is located adjacent to the back side 22 of the slider body 26, and provides electrical insulation between the slider body 26 and other layers of the stack 100. The insulator layer 102 can be formed of any suitable insulator material, for example, $Al_2O_3$.

The lower diffusion barrier layer 104 is located adjacent to the insulator layer 102 and opposite the slider body 26, that is, the lower diffusion barrier layer 104 is located on top of the insulator layer 102. The lower diffusion barrier layer 104 is generally slightly smaller in width or diameter than the insulator layer 102. The function of the lower diffusion barrier layer 104 is to minimize diffusion of materials (e.g., conductive materials) into the insulator layer 102, and thereby help maintain the integrity of the insulator layer 102. The lower diffusion barrier layer 104 can be formed of Cr, or another suitable material as desired (e.g., Ti Nitride and Ta Nitride).

The conductor layer 106 is located adjacent to the lower diffusion barrier layer 104, that is, the conductor layer 106 is located on top of the lower diffusion barrier layer 104 and, in turn, on top of the insulator layer 102. The conductor layer 106 functions as the principle carrier of electrical current through the stack 100 and to other connected components (see FIGS. 6B and 8). The conductor layer 106 can be formed of Cu, or another suitable material as desired. Cu is a desirable material due to its low electrical resistance and suitable mechanical properties.

The upper diffusion barrier layer 108 is located adjacent to the conductor layer 106 and opposite the slider body 26, that is, the upper diffusion barrier layer 108 is located on top of the conductor layer 106. The function of the upper diffusion barrier layer 108 is to minimize diffusion of materials at or near the top of the conductor layer 106. The upper diffusion barrier layer 108 can be formed of Ni, or another suitable material as desired.

The oxidation barrier layer 110 is located adjacent to the upper diffusion barrier layer 108, that is the oxidation barrier layer 110 is located on top of the upper diffusion barrier layer 108 and, in turn, on top of the conductor layer 106. The oxidation barrier layer 110 forms a bonding layer that is consumed when forming a connection to the stack 100, such as during an Ag—Sn soldering procedure similar to that described below with respect to FIG. 6B. The oxidation barrier layer 110 can be formed of Au, which is a material with good wetting properties that also helps prevent oxidation or corrosion of the upper diffusion barrier layer 108.

The wick-stop layer 112 is disposed to cover otherwise exposed surfaces of the diffusion barrier layers 104 and 108 and the conductor layer 106. The wick-stop layer 112 can optionally cover selected portions of the oxidation barrier layer 110 (not shown). The wick-stop layer 112 is a thin coating of material that minimizes wetting in particular regions when the stack 100 is connected to another component, such as during a soldering operation. This helps to avoid migration of reflowed solder material away from a desired location, which assists in the creation of reliable electromechanical connections to the stack 100. The wick-stop layer 112 can be, for example, a dielectric material like $SiO_2$ or $Al_2O_x$. Alternatively, the wick-stop layer can include multiple materials. For example, wick-stop layer 112 can alternatively include an inner layer of a first material (e.g., $Al_2O_3$) that is about 1,000-5,000 Å or more thick and an outer layer of a second material (e.g., diamond-like carbon) that is about 200-500 Å thick.

The insulator layer 102 can have a thickness of, for example, about 3,000 Å and a width or diameter $W_I$ of, for example, about 88-92 μm. The lower diffusion barrier layer 104 can have a thickness of, for example, about 500 Å and a width or diameter comparable to that of the conductor layer 106 (e.g., about 84-86 μm). The conductor layer 106 can have a thickness of, for example, about 3,000 Å and a width of diameter $W_C$, for example, of about 84-86 μm. The upper diffusion barrier layer 108 can have a thickness of, for example, about 3,000 Å and a width or diameter comparable to that of the conductor layer 106 (e.g., about 84-86 μm). The oxidation barrier layer 110 can have a thickness of, for example, about 500 Å and can have a width or diameter $W_B$ of, for example, about 80 μm. The wick-stop layer 112 can be applied to a thickness of about 200 Å. It should be recognized that the exemplary dimensions given above can vary according to the particular application, as desired.

Electromechanical connections to the stack 100 can be formed according to the following example. First, a solder connection to the stack 100 is formed by placing a solder material (e.g., an Ag—Sn solder paste) between the stack 100 and an adjacent component, such as an electromechanical connection pad on a suspension assembly (see FIG. 8). The solder is then reflowed and the oxidation barrier layer 110 of the stack 100 is consumed to form a soldered connection. In other words, the material of the oxidation barrier layer 110 and the solder material are heated (i.e., wet) and combined to form a metallurgical bond as they cool and harden. The wick-stop layer 112 constrains undesired migration of materials during the reflow process.

FIG. 6B is a schematic cross-sectional view of the multi-layer stack 100' soldered to an adjacent component 114, where stack 100' represents stack 100 in a soldered state. As shown in FIG. 6B, the oxidation barrier layer (110) is combined with solder material to form a soldered electromechanical connection 110' between the stack 110' and the component 114. Electrical current can pass between the component 114 and the conductor layer 106 of the stack 100' through the electromechanical connection 110'. It should be noted that the upper diffusion barrier layer 108 helps reduce the diffusion of material from the electromechanical connection 110' to the conductor layer 106, although it is possible that some diffusion may still occur.

FIG. 6C is a schematic cross-sectional view of an alternative multi-layer stack 120. Stack 120 is similar to stack 100 shown and described with respect to FIG. 6A. However, the stack 120 further includes an optional seed layer 122 located between the insulator layer 102 and the slider body 26. The seed layer 122 facilitates plating of the insulator layer 102 onto the slider body 26. The seed layer 122 can have a thickness of, for example, about 100 Å and a width commensurate with the desired width of the insulator layer 102. The seed layer can comprise Ta, or another suitable material as desired.

Figure 7:
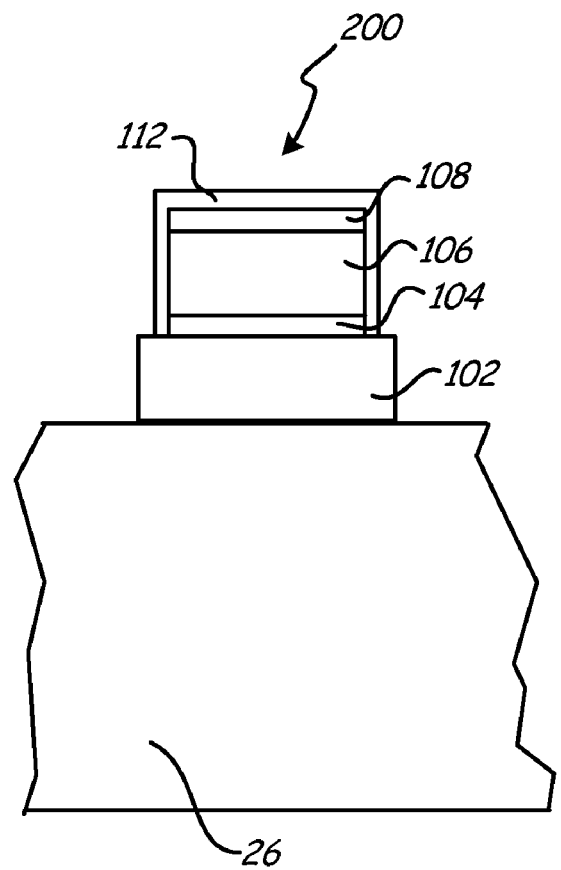
FIG. 7 is a schematic cross-sectional view of a multi-layer interconnect trace stack according to the present invention.

FIG. 7 is a schematic cross-sectional view of a multi-layer stack 200, which can form part of an interconnect trace portion of a slider assembly. The stack 200 includes an insulator layer 102, a lower diffusion barrier layer 104, a conductor layer 106, an upper diffusion barrier layer 108, and a wick-stop layer 112. Typically, the stack 200 forms an elongate path for transmitting electrical current, although the particular shape and arrangement of the stack 200 will vary according to the particular application. The conductor layer 106 is the primary carrier of electrical current through the stack 200.

The arrangement and composition of the layers of the stack 200 can be generally similar to the stack 100, as shown and described with respect to FIG. 6A. However, the stack 200 does not include a bonding layer, and therefore the wick-stop layer 112 covers the top of the uppermost layer (i.e., the upper diffusion bonding layer 108). Making the layers of the stack 200 similar to the stack 100 can simplify fabrication of an interconnect structure of a slider assembly, by permitting use of substantially the same fabrication process to construct both stacks 100 and 200. The stack 200 can further differ from the stack 100 in other embodiments. For instance, the upper diffusion barrier layer 108 is optional, and can be omitted from the stack 200.

The structures of the present invention described above can be fabricated using conventional techniques known to those of ordinary skill in the art of thin film head design and manufacture, including techniques such as photolithography, etching, plating, variable-angle deposition, and techniques similar to, but not limited by, those described in commonly-assigned U.S. Pat. Nos. 5,610,783 and 5,774,975.

Figure 8:
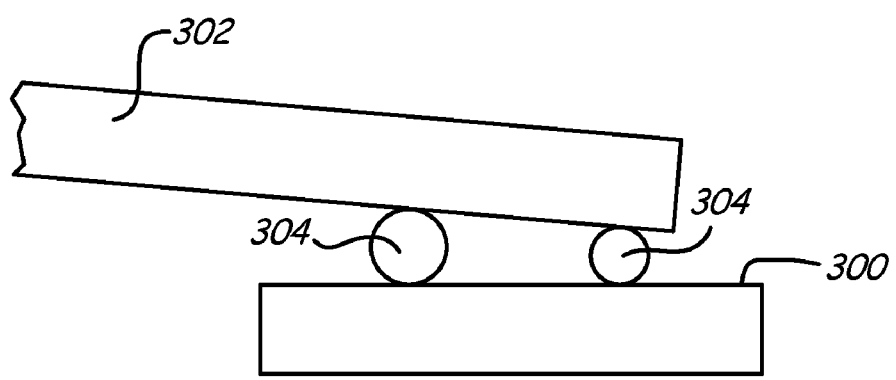
FIG. 8 is a simplified schematic side view of a slider assembly according to the present invention supported by a suspension assembly.

FIG. 8 is a simplified schematic side view of a slider assembly 300 supported by a suspension assembly 302, which is illustrated as having integral electrical traces. A number of solder connections 304 are provided to both mechanically and electrically connect (i.e., to electromechanically connect) the slider assembly 300 to the suspension assembly. The solder connections can be made at top bond pads of the slider assembly 300, which can be arranged for cooperative engagement with electrical connection pads on the suspension assembly 302. in the configuration shown in FIG. 8, there is no need for separate electrical and mechanical connections between the slider assembly 300 and the suspension assembly 302, and, thus, fabrication can be simplified.

It should be recognized that the present invention provides numerous advantages. For example, top bond pads located relative to the back side of a slider assembly promote reliable fabrication. Because more space is available at the back side of a slider than at its sides or edges, top bond pads can be larger in size than might otherwise be feasible at side or edge locations. Top bond pads thereby permit the reliable use of conventional connection methods (and corresponding equipment) to electrically and mechanically connect the top bond pads of the slider to other support and/or interconnect components. Also, localized insulators can be fabricated without the need to etch away portions of the insulator and redeposit conductor materials. Fabrication is further benefited in that thick, unitary sheet insulators make alignment in reference to the slider body more difficult. Thus, the present invention provides advantages over other possible means of providing top bond pads at a back side of a slider.

Moreover, the use of a plurality of discrete, localized insulators as part of interconnect structures along the back side of a slider assembly provides additional benefits. The relatively small areas of these structures isolate film stress, such as residual stress from deposition and thermal stress induced by differing coefficients of thermal expansion of components of the slider assembly, because film stress is proportional to area.

Although the present invention has been described with reference to several alternative embodiments, workers skilled in the art will recognize that changes may be made in form and detail without departing from the spirit and scope of the invention. For instance, the particular materials of each layer of the multi-layer interconnect structures can vary from the examples given above. Moreover, the particular layout, positioning and arrangement of the slider assembly of the present invention will vary according to the particular application, as desired.

The invention claimed is:

1. A slider comprising:
   a slider body having a first side and edges defined adjacent to the first side;
   at least two separate insulators each adjacent to the first side of the slider body and supported by the slider body; and
   a conductive trace adjacent to each of the at least two separate insulators and opposite the first side of the slider body, wherein the at least two separate insulators each are in physical contact with the slider body along the first side of the slider body such that the at least two separate insulators are physically attached to the slider body to electrically insulate each conductive trace from the slider body.

2. The slider of claim 1 and further comprising a bond pad structure adjacent one of the conductive traces.

3. The slider of claim 1 and further comprising a wick-stop layer located adjacent one of the conductive traces and opposite the adjacent insulator.

4. The slider of claim 1, wherein each insulator has a first dimension that is greater than a corresponding first dimension of the adjacent conductive trace, wherein the first dimensions are defined in a direction that is generally parallel to the first side of the slider body.

5. The slider of claim 1, wherein at least one of the conductive traces extends to a trailing edge of the slider.

6. A slider assembly comprising:
   a slider body having a first side;
   an overcoat portion adjacent to and supported by the slider body that has a first side substantially parallel to the first side of the slider body, wherein the overcoat portion defines an edge of the slider assembly;
   an insulator layer extending along a portion of the first side of the slider body and supported by the slider body;
   a first electrically conductive trace extending along a portion of the insulator layer and supported by the slider body;
   an electrical lead embedded in the overcoat portion and electrically connected to the first electrically conductive trace;
   a second electrically conductive trace extending from the first trace and electrically connected to the electrical lead; and
   a first bond pad adjacent the first electrically conductive trace and supported by the slider body, the first bond pad being electrically connected to the first electrically conductive trace.

7. The slider assembly of claim 6, wherein an outer portion of the stud is located at the edge of the slider assembly.

8. The slider assembly of claim 6, wherein the second electrically conductive trace contacts the overcoat.

9. The slider assembly of claim 6 and further comprising:
   a second bond pad located adjacent to the electrical lead and relative to the edge of the slider assembly, wherein the second bond pad is electrically connected to the electrical lead.

10. The slider assembly of claim 6 and further comprising:
    a seed layer trace located at the edge of the slider assembly, wherein the seed layer trace is electrically connected between the electrical lead and the second electrically conductive trace.

11. The slider assembly of claim 6 and further comprising:
    a seed layer trace that is electrically connected between the electrical lead and the first electrically conductive trace.

12. A slider assembly comprising:
    a slider body having a first side;
    an overcoat portion adjacent to and supported by the slider body that has a first side substantially parallel to the first side of the slider body, wherein the overcoat portion defines an edge of the slider assembly;
    an insulator layer extending along a portion of the first side of the slider body and extending over part of the overcoat portion;
    a first electrically conductive trace extending along a portion of the insulator layer and supported by the slider body, wherein the first electrically conductive trace extends beyond the insulator layer at a location adjacent to the overcoat portion;
    an electrical lead embedded in the overcoat portion and electrically connected to the first electrically conductive trace at or near the first side of the overcoat portion; and
    a first bond pad adjacent the first electrically conductive trace and supported by the slider body, the first bond pad being electrically connected to the first electrically conductive trace.

* * * * *